(12) United States Patent
McIntyre

(10) Patent No.: US 10,378,793 B2
(45) Date of Patent: Aug. 13, 2019

(54) HIGH-TEMPERATURE HEAT SHIELD ASSEMBLY

(71) Applicant: The Texas A&M University System, College Station, TX (US)

(72) Inventor: Peter McIntyre, Bryan, TX (US)

(73) Assignee: The Texas A&M University System, College Station, TX (US)

( * ) Notice: Subject to any disclaimer, the term of this patent is extended or adjusted under 35 U.S.C. 154(b) by 14 days.

(21) Appl. No.: 15/839,586

(22) Filed: Dec. 12, 2017

(65) Prior Publication Data

US 2018/0163996 A1 Jun. 14, 2018

Related U.S. Application Data

(60) Provisional application No. 62/433,082, filed on Dec. 12, 2016.

(51) Int. Cl.
| | | |
|---|---|---|
| *F16L 59/14* | (2006.01) | |
| *F24S 80/60* | (2018.01) | |
| *B01J 19/00* | (2006.01) | |
| *B01J 19/18* | (2006.01) | |
| *F16L 59/147* | (2006.01) | |

(52) U.S. Cl.
CPC ........... *F24S 80/60* (2018.05); *B01J 19/0013* (2013.01); *B01J 19/18* (2013.01); *B01J 2219/0009* (2013.01); *B01J 2219/0015* (2013.01); *B01J 2219/00155* (2013.01); *F16L 59/147* (2013.01); *Y10T 428/231* (2015.01); *Y10T 428/234* (2015.01)

(58) Field of Classification Search
CPC ............. Y10T 428/231; Y10T 428/234; Y10T 428/239; F16L 59/02; F16L 59/06; F16L 59/14; F16L 59/147

See application file for complete search history.

(56) References Cited

U.S. PATENT DOCUMENTS

| | | | | |
|---|---|---|---|---|
| 1,969,621 | A | * | 8/1934 | Munters ................. F16L 59/07 220/DIG. 9 |
| 3,130,940 | A | | 4/1964 | Erb et al. |
| 3,231,125 | A | | 1/1966 | Sigona |
| 4,172,915 | A | | 10/1979 | Sheptak et al. |
| 4,505,977 | A | | 3/1985 | Hasenauer et al. |
| 5,246,759 | A | | 9/1993 | Keller |
| 5,270,092 | A | * | 12/1993 | Griffith ..................... B32B 3/12 428/69 |
| 5,524,406 | A | * | 6/1996 | Ragland ............... B23K 11/087 219/117.1 |
| 5,975,852 | A | | 11/1999 | Nagaraj et al. |
| 6,967,051 | B1 | | 11/2005 | Augustynowicz et al. |
| 7,240,513 | B1 | | 7/2007 | Conforti |

(Continued)

*Primary Examiner* — Alexander S Thomas
(74) *Attorney, Agent, or Firm* — Winstead PC

(57) ABSTRACT

A heat shield bladder includes first and second sheets of insulating material that form a bladder between the first and second sheets. At least one reflective foil is disposed within the bladder and a plurality of spacers are disposed within the bladder and positioned to space the at least one reflective foil from the first and second sheets of insulating material. Multiple reflective foils may be disposed within the bladder with spacers between each reflective foil. The heat shield bladder may be rolled into a tube shaped and used inside a pipe or formed into panels that may be used to line a vessel.

6 Claims, 5 Drawing Sheets

(56) References Cited

U.S. PATENT DOCUMENTS

2002/0098316 A1\* 7/2002 Butler .................... B32B 3/266
                                                          428/72
2013/0192160 A1   8/2013 Meredith
2018/0163996 A1   6/2018 McIntyre \* cited by examiner

HIGH-TEMPERATURE HEAT SHIELD ASSEMBLY

CROSS-REFERENCES TO RELATED APPLICATIONS

This application claims the benefit under 35 U.S.C. § 119(e) of U.S. Provisional Patent Application No. 62/433,082, filed Dec. 12, 2016, which is incorporated herein by reference in its entirety as if fully set forth herein.

BACKGROUND OF THE INVENTION

The present disclosure relates to the field of heat transfer, and more particularly to the provision of thermal isolation between a volume of high-temperature fluid and a vessel that contains the high-temperature fluid. There are applications that require use of a high-temperature fluid to store heat and to deliver the heat for use in an application, such as electric power generation, control of a chemical synthesis reaction, extraction of ore, high-efficiency electric batteries, secondary recovery of oil in a producing stratum, or heat transfer and neutronics in a critical or subcritical fission core. In some of the applications, the high-temperature fluid with most beneficial properties is molten salt. For many of the applications, the performance and energy efficiency of the process improves with temperature up to 800° C. For such applications, the metals ordinarily used in vessels and piping cannot reliably operate in contact with molten salt at temperatures above 600° C. Such applications are typically limited by the strength of metals and alloys at high temperature and by chemical corrosion of the metals or alloys. At these high temperatures, conventional structural metals lose their strength and metal surfaces corrode at a significant rate. Metal alloys containing a high fraction of nickel are capable of operating reliably at 800° C. while resisting corrosion. However, such alloys are very expensive and would not be affordable as the material of a tank and piping for many of the applications cited above.

SUMMARY

A hermetic heat shield bladder is used to decrease a temperature at a wall of a vessel, such as a pipe or tank, that contains a high-temperature fluid, such as molten salt, and thus provides a possibility to use less expensive materials for the vessel while still providing reliable operation.

An embodiment of the invention is directed to a hermetic heat shield bladder that limits radiative and conductive heat transfer in high-temperature applications. The hermetic heat shield bladder makes it possible to sustain a large temperature difference on opposite faces of the bladder while requiring only a modest heat transfer to maintain the temperature difference. Examples of applications include systems utilizing molten salt, heat storage in concentrated solar power, safe nuclear fission power, metal extraction from ores, and chemical synthesis requiring high temperature.

Additionally, a method is disclosed wherein a multi-layer bladder is located as a liner adjacent to an inside surface of a vessel that contains a hot molten fluid. The bladder comprises a hermetically sealed laminate containing a plurality of highly reflective thin metal foils, such as electropolished nickel, located within a sheath. The foil layers are spaced apart from one another within the bladder by a pattern of spacers, such as ceramic buttons or bars, that provide spacing among the sheath faces and the adjacent foil layers. The sheath is formed from two sheets of corrosion-resistant metal, and the sheath is sealed by welding along mating peripheral edges of the two sheets so that the interior of the sheath is hermetic. In some embodiments, the welded edges are folded away from a hot side of the bladder so that all welds are located on the cold side of the bladder so that the welds operate at the temperature of the cold side.

A hermetic heat shield bladder presents an effective isolation of various forms of heat transfer between two faces of the bladder (e.g., conduction, radiation, convection). The reflective layers inside act as a multi-layer radiative heat shield. The ceramic buttons provide spacing to limit contact of adjacent foil layers. An interior of the bladder may be filled with an inert gas, for example argon or krypton, which limits conduction and convection as mechanisms for heat transfer. The pressure of the gas filling the bladder is sufficient to provide approximate pressure balance at operating temperature against the hydraulic force from the filling of molten fluid in the vessel. For a range of bladder parameters, a volume of molten fluid passing through a cavity surrounded by the bladder (e.g., see FIG. 2) can be sustained at 800° C. while limiting the wall temperature of the containing vessel to about 500° C. The wall temperature of the vessel can be regulated by flow of a secondary heat transfer fluid flowing through a heat trace configured in thermal contact with the outside walls of the vessel.

The bladder makes it possible to limit heat transfer more effectively than with ceramic insulation. Limiting the heat transfer from the fluid results in a lower vessel temperature, which in turn permits the vessel to be made of less expensive materials while still maintaining a long service life. The quantity of expensive high-nickel alloy that is used in the sheath of the bladders is much less than that of the vessel and piping, so that inexpensive metals can be used with impunity.

The hermetic heat shield bladder provides a semi-flexible heat barrier that can be fitted into a new vessel or re-fitted into an existing vessel. It can be fabricated either in flat or curved geometry to 'wallpaper' a surface of a vessel, such as a large pipe, tank, and the like, or in a cylindrical or tube geometry for installation in a piping. In such installations the molten fluid would be present on both faces of the heat shield so that the laminar assembly would be required to support pressure only equal to the hydraulic pressure in the molten fluid—it would not be required to support the overall containment of the molten fluid.

The hermetic heat shield bladder makes it possible to significantly reduce the temperature at the surfaces of the vessel and piping compared to that of the molten fluid inside. As a result, the vessel and piping can be fabricated from affordable alloys, for example of steel. The thin surface layers of the heat shield, which are stable against corrosion at high temperature, are the only elements that are made from expensive alloys. The bladder can also be readily replaced, either in a provision of preventive maintenance or when a bladder fails. The total manufactured cost of the bladder can be a small fraction of the manufactured cost of a vessel and piping made from expensive high-temperature corrosion-resistant alloys.

Radiant heat shields have been provided for cryogenic applications and for applications at furnace temperature, but typically only in situations in which the bladder operates in vacuum or in a non-corrosive atmosphere. A distinction of the present hermetic heat shield bladder is the provision of a hermetic enclosure, inside of which a laminar stack of high-reflectivity foils are spaced apart by a modest gap. The succession of reflective surfaces suppresses radiant heat transfer from one face of the bladder to the other. The foil layers are spaced apart by spacers, which may be, for example, ceramic tab insulators, so that conductive heat transfer is also reduced. The void space within the bladder is filled with an inert gas of low thermal conductivity so that conductive heat transfer is further blocked. The two thin surface layers are made from a high-temperature corrosion-resistant alloy, for example Hastelloy, and the welds that join the two face layers are located on the side of the bladder that will be facing the cooler wall of the vessel or piping, so that the weld operates only the lower-temperature region of molten fluid in the vessel.

In some embodiments, the hermetic heat shield bladder is fabricated as a laminar assembly of high-reflectivity foils, for example electropolished nickel, assembled with an array of ceramic tabs or bars located to space neighboring foils apart by a controlled separation, and a sheath comprising a pair of sheets composed of a high-temperature corrosion-resistant alloy, for example Hastelloy. Reflectivity for a given metal is a function of wavelength. The spectrum of light emitted in blackbody radiation is a function of temperature. As used herein, high-reflectivity is meant to describe a reflectivity of greater than or equal to 90%. Reflectivities of less than 90% may be used but performance will be reduced compared to higher reflectivities. Reflectivity of the foils may be increased by coating the foils with a second material. For example, a rhodium coating may be included on the surface of a nickel foil to enhance the reflectivity of the nickel foil. The coating may be thin (e.g., micron thickness). Other reflective materials having high melting temperatures may be used as coatings (e.g., gold). High-temperature is used herein to identify temperatures in the range of 800° C., but a person of ordinary skill in the art will recognize that this temperature may vary between lower and higher temperatures. The pair of surface-layer sheets are joined and sealed by welding to form the sheath of a hermetic bladder in which the enclosed space containing the reflective foils is sealed from exposure to molten fluid when the bladder is installed in a vessel and the vessel is filled with molten fluid. In some embodiments, the inner surface-layer sheet is shaped, for example, by die-stamping so that an edge of the inner surface-layer foil form a curled or cup-like shape with a lip oriented toward what will become a cold side of the bladder. By this provision the welds operate at the cool end of the molten fluid temperature difference and are less susceptible to corrosion.

In an embodiment of the invention, the entire hermetic heat shield bladder can be fabricated with an overall thickness of 1-5 cm. The flexible geometry and small excluded volume make the hermetic heat shield bladder attractive for the above-cited applications.

A further embodiment of the invention is a hermetic heat shield bladder for use in a large molten salt storage vessel and piping in a concentrated solar power installation. In certain embodiments, the heat shield bladder can be used to retrofit existing molten salt storage installations.

A heat shield bladder includes inner and outer sheets of corrosion-resistant metal alloy that are sealed together at their boundaries to form a hermetic bladder. At least one reflective foil is disposed to form a reflective heat shield within the bladder and positioned to space the at least one reflective foil in the space between the inner and outer sheets of the bladder. Multiple reflective foils may be disposed within the bladder with spacers between each layer. The heat shield bladder may be formed in a tube shape and used to line the inside of a pipe or may be formed into flat or curved panels that may be used to line the inner walls of a tank or other storage vessel.

BRIEF DESCRIPTION OF THE DRAWINGS

A more complete understanding of embodiments of the present invention may be obtained by reference to the following Detailed Description when taken in conjunction with the accompanying Drawings wherein.

DETAILED DESCRIPTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1A:
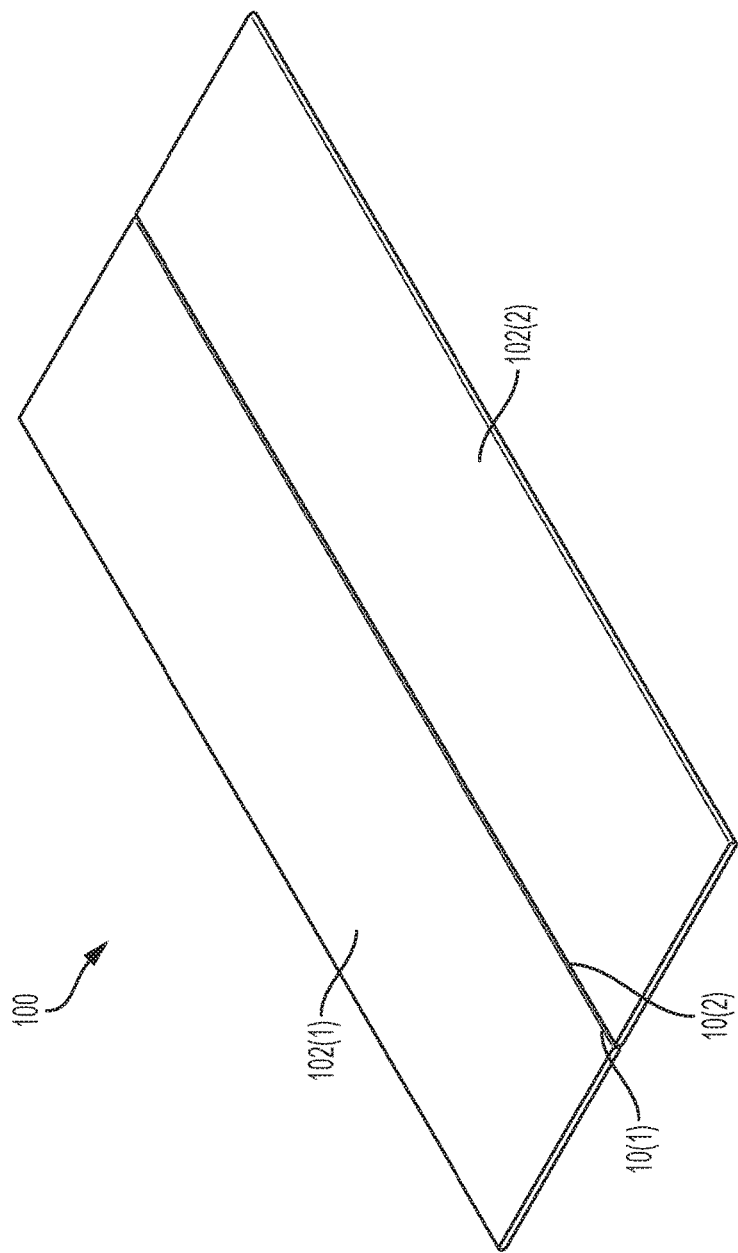
FIG. 1A is an isometric view of a hermetic heat shield bladder system.
Figure 1B:
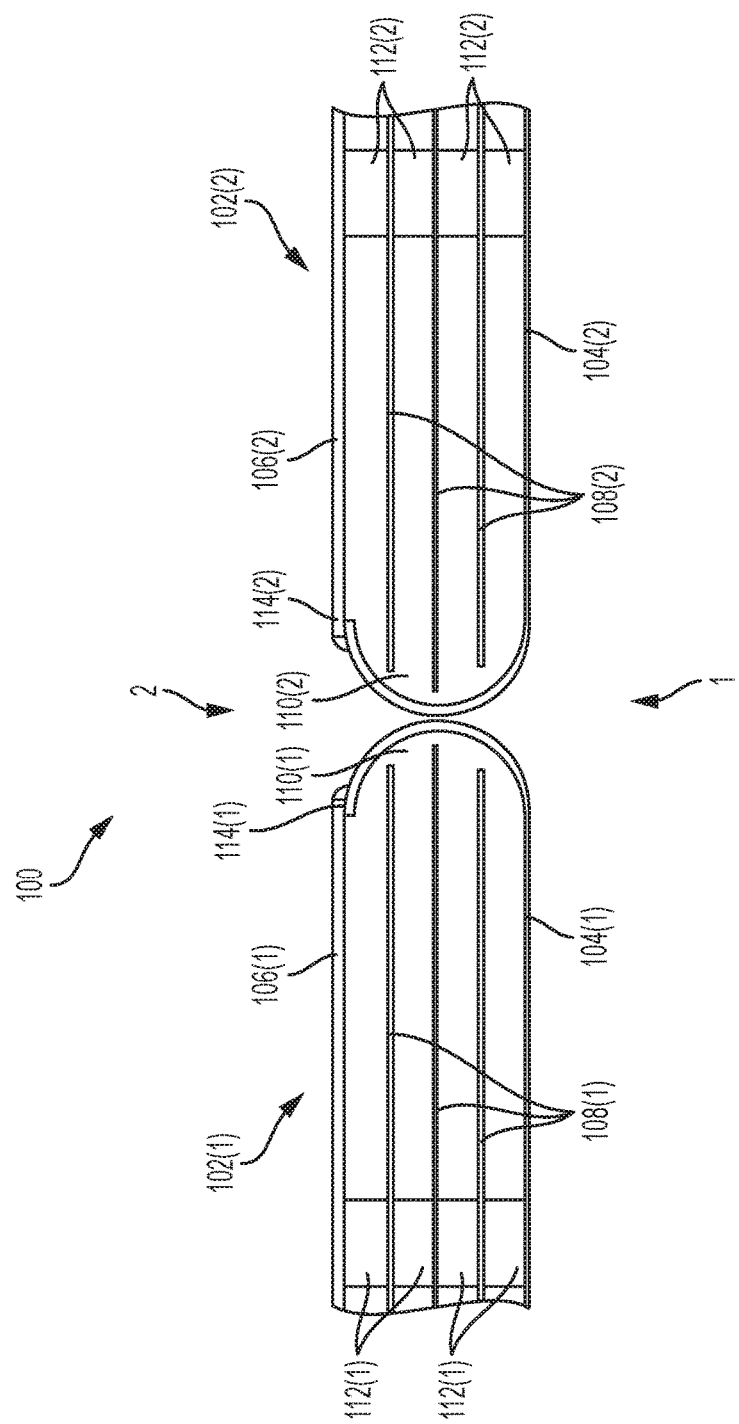
FIG. 1B is a partial cross-sectional view of the hermetic heat shield bladder system of FIG. 1A.

FIG. 1A is an isometric view of a hermetic heat shield bladder system 100 and FIG. 1B is a partial cross-sectional view of the hermetic heat shield bladder system 100. The bladder system 100 of FIGS. 1A and 1B includes a first hermetic heat shield bladder 102(1) and a second hermetic heat shield bladder 102(2). The first hermetic heat shield bladder 102(1) and the second hermetic heat shield bladder 102(2) comprise similar components and construction. The description of the first hermetic heat shield bladder 102(1) below is applicable to the second hermetic heat shield bladder 102(2) as well. FIG. 1A illustrates the first hermetic heat shield bladder 102(1) and the second hermetic heat shield bladder 102(2) in a flat arrangement with edges 10(1) and 10(2) positioned next to one another. The hermetic heat shield bladders 102 can be secured to one another and to the vessel wall using brackets, ties, and the like. The arrangement shown in FIG. 1A can be used to 'wall paper' walls of a vessel. In such embodiments, multiple hermetic heat shield bladders 102 may be used as needed to cover a desired area. The shape of the hermetic heat shield bladder 102 may be customized for particular installations. For example, the hermetic heat shield bladder 102 does not have to be rectangular in shape and may be configured into a variety of other shapes to more precisely fit within a vessel. The hermetic heat shield bladder 102 may be folded or manipulated into other shapes to conform to the contours of a vessel.

In a typical embodiment, each hermetic heat shield bladder 102 of the bladder system 100 has a similar construction. Similar components have been given similar numbers in FIG. 1B. The first hermetic heat shield bladder 102(1) includes an inner sheet 104(1) and an outer sheet 106(1). Each of the inner sheet 104(1) and the outer sheet 106(1) is made of a metal or alloy that is corrosion-resistant for long-term operation in contact with the fluid to be contained in the vessel. In some embodiments, the inner sheet 104(1) and the outer sheet 106(1) are made of Hastelloy. In other embodiments, Incoloy alloys and high-nickel alloys, such as C-276 (57% Ni), C-22 (56% Ni), and N (71% Ni), may be used. The inner sheet 104(1) and the outer sheet 106(1) are joined together at their edges to hermetically seal the interior of the bladder. The edges may be joined together by a weld.

To protect the welds from high temperature, an edge of the inner sheet 104(1) may folded or curled back so that a welded portion 114(1) is positioned away from an inner side 1 and closer to an outer side 2. The inner side 1 refers to a side that is exposed to a high-temperature fluid (e.g., molten salt) and the outer side 2 refers to a side that is contained within the fluid and abuts a vessel wall. In some embodiments, the inner side 1 may be at temperature of around 800° C. while the outer side 2 may be at a temperature of around 500° C. Locating the welded portion 114(1) away from the inner side 1 improves corrosion resistance of the welded portion 114(1).

At least one reflective foil 108(1) is located within the bladder 110(1). The at least one reflective foil 108(1) helps reduce radiative heat transfer from the inner side 1 of the bladder system 100 to the outer side 2 of the bladder system 100. During use, a fluid at the inner side 1 of the bladder 102(1) is at a desired high temperature, for example 800° C., and the fluid at the outer side 2 that is in the region between the vessel wall and the outer sheet 106(1) of the bladder 102(1) operates at the temperature of the vessel wall, for example 500° C. The two regions are connected as a single fluid volume and so are hydraulically connected, but the fluid at the inner side 1 and the outer side 2 operates at different temperatures. The temperature of the fluid at the vessel wall is limited to being above the melt temperature of the fluid so that the fluid at the outer side 2 does not freeze. In some embodiments, the at least one reflective foil 108(1) comprises multiple foils. The at least one reflective foil 108(1) is spaced apart from the inner sheet 104(1) and the outer sheet 106(1) by a plurality of spacers 112(1). In some embodiments, the at least one reflective foil 108(1) is made of nickel.

In some embodiments, the inner sheet 104(1) and the outer sheet 106(1) each comprise a separate sheet that are joined together along an entire periphery of the hermetic heat shield bladder 102(1). In some embodiments, the inner sheet 104(1) and the outer sheet 106(1) may be formed by folding a single sheet in half. In such an embodiment, a side along the fold does not need to be joined and only the remaining edges are joined together.

In some embodiments, the bladder 110(1) is filled with a low-pressure inert gas, such as, for example, argon, which limits convection as a mechanism for heat transfer. Other gases that could be used include Ne, Ar, $N_2$, $CO_2$, and Kr. The gas used should be chemically inert when in contact with the foils inside the bladder.

As shown in FIG. 1B, the hermetic heat shield bladder 102(1) includes the plurality of spacers 112(1) that help position the at least one radiative foil 108(1) within the bladder 110(1). The plurality of spacers 112(1) may be positioned throughout the bladder 110(1) as desired to maintain spacing of the at least one reflective foil 108 between the inner sheet 104(1) and the outer sheet 106(1) (e.g., see FIG. 2). The plurality of spacers 112 may be made of various materials, including ceramics (e.g., fiber reinforced ceramics). In general, the plurality of spacers 112 can be made from materials that can provide structural support at the elevated temperatures to which the hermetic heat shield bladder 102 is exposed.

Figure 2:
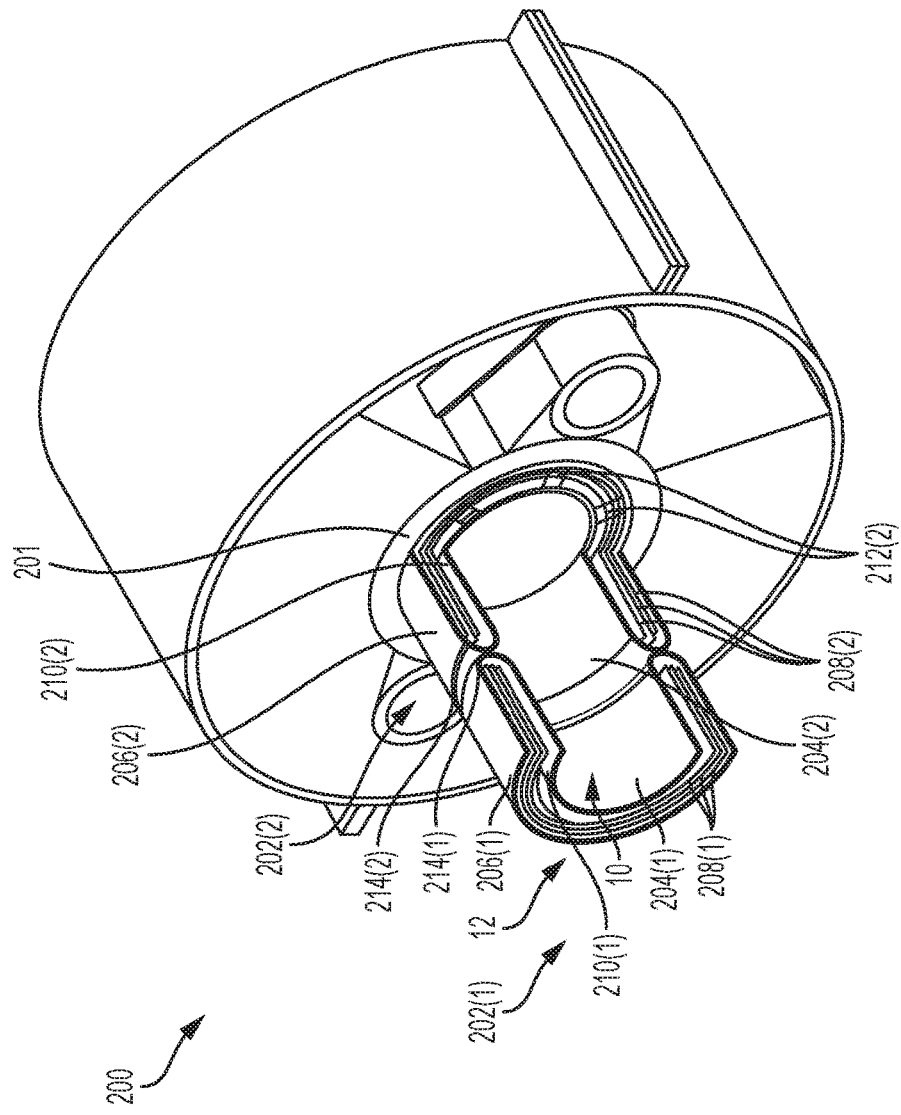
FIG. 2 is an illustration of a hermetic heat shield bladder system installed in a pipe.

FIG. 2 is an illustration of a hermetic heat shield bladder system 200 in partial cross-section installed in a pipe 201. The bladder system 200 of FIG. 2 is configured as an assembly of hermetic heat shield bladders 202 that are positioned end-to-end within an overall segment of the pipe 201. Portions of a first hermetic heat shield bladder 202(1) and a second hermetic heat shield bladder 202(2) are shown in FIG. 2. The first hermetic heat shield bladder 202(1) and the second hermetic heat shield bladder 202(2) comprise similar components and construction. The description of the first hermetic heat shield bladder 202(1) below is applicable to the second hermetic heat shield bladder 202(2) as well. The bladder system 200 insulates the pipe 201 from hot fluid passing through the bladder system 200. The first hermetic heat shield bladder 202(1) and the second hermetic heat shield bladder 202(2) are of similar construction to the hermetic heat shield bladder 102 discussed above relative to FIGS. 1A and 1B. Similar parts will be given similar part numbers. The first hermetic heat shield bladder 202(1) includes an inner tube 204(1), an outer tube 206(1), at least one reflective foil tube 208(1), a bladder 210(1), and a plurality of spacers 212 (shown in the partial cross section of the second hermetic heat shield bladder 202(2)).

The inner tube 204(1) and the outer tube 206(1) each comprise a seamless tube of high-temperature corrosion-resistant alloy, for example Hasteloy. The seamless structure of the inner tube 204(1) and the outer tuber 206(1) may be formed by drawing out a tube from a billet of metal into the desired dimensions. The outer tube 206(1) comprises a diameter that is larger than a diameter of the inner tube 204(1) but small enough to fit inside the pipe 201. Each of the inner tube 204(1) and the outer tube 206(1) includes first ends and second ends, with the first end of the inner tube 204(1) being adjacent to the first end of the outer tube 206(1) when the inner tube 204(1) is inserted into the outer tube 206(1). The adjacent first and second ends of the inner tube 204(1) are joined to first and second ends of the outer tube 206(1), respectively, to create a bladder in an annular space between the inner tube 204(1) and the outer tube 206(1). In a typical embodiment, the first and second ends of the inner tube 204(1) are curled back away from an inner side 10 of the bladder 202(1) toward the outer tube 206(1). Curling the first and second ends of the inner tube 204(1) allows for the weld of the first and second ends of the inner tube 204(1) and the outer tube 206(1) to be positioned away from the inner side 10, where the fluid temperature is greatest, and closer to an outer side 12, where the fluid temperature is lower. Positioning the weld in this way increases the weld's corrosion resistance.

The at least one reflective foil tube 208(1) is disposed in the bladder 210(1) between the inner tube 204(1) and the outer tube 206(1). In some embodiments, the at least one reflective foil tube 208(1) comprises multiple layers of reflective foil tube 208. Each reflective foil tube 208 is made by forming a sheet of reflective foil, for example nickel, into a cylindrical tube of the appropriate diameter and joining edges of the sheet by spot welding. Successive reflective foil tubes 208 are spaced apart using the plurality of spacers 212.

In some embodiments, the hot fluid passing through the bladder system 200 is a molten salt at a temperature of around 800° C. The bladder system 200 can comprise any number of hermetic heat shield bladders 202 to form a cylindrical shell of a desired length to fit within a length of the pipe 201. The bladder system 200 insulates the pipe 201 from the heat of the fluid passing therethrough, which allows the pipe 201 to be made of less expensive materials that have lower heat tolerance.

Figure 3:
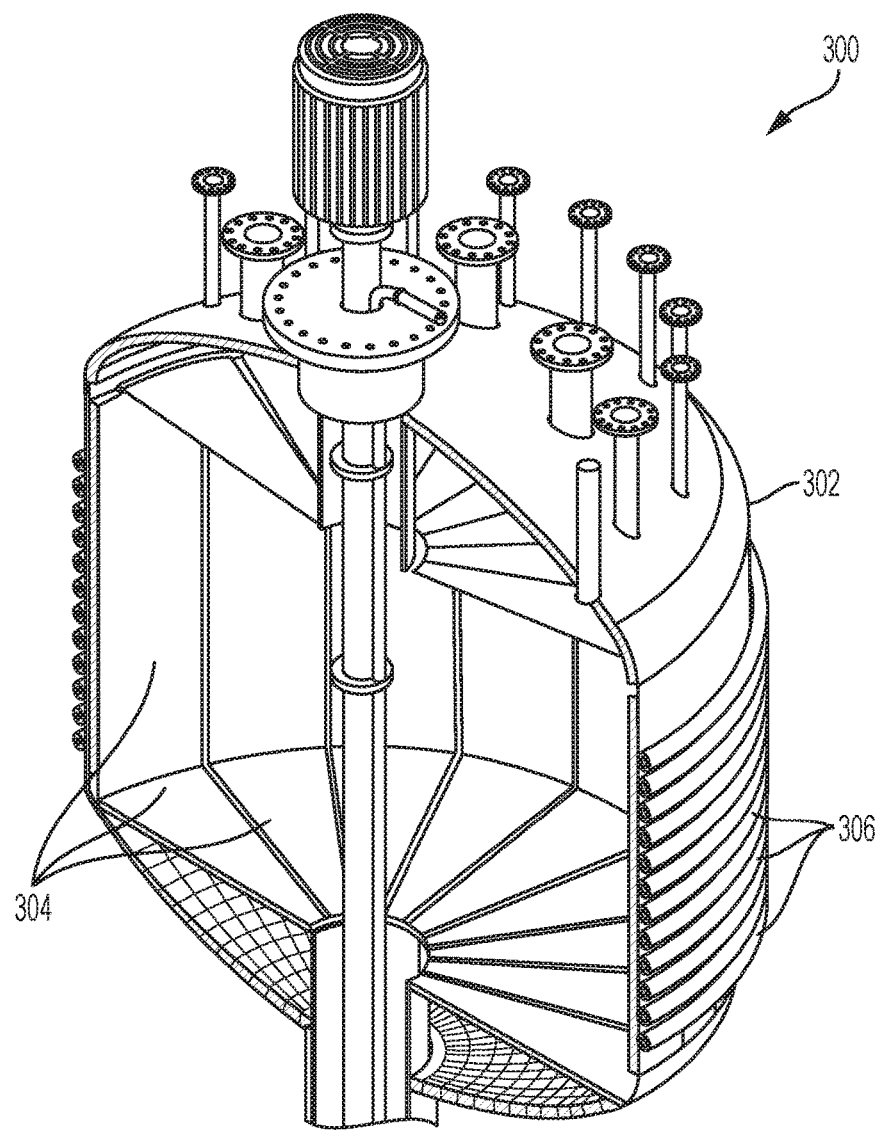
FIG. 3 is an illustration of a hermetic heat shield bladder system installed inside a tank.

FIG. 3 is an illustration of a hermetic heat shield bladder system 300 installed inside a tank 302. In the embodiment of FIG. 3, walls of the tank 302 are lined with a plurality of panels 304. An interior of the tank 302 may contain a hot fluid, such as, for example, molten salt. The plurality of panels 304 provide insulation that protects the tank 302 from the hot fluid. Each panel 304 can include one or more bladders (similar to bladders 102, 202 discussed above). For example, each panel 304 may be formed as a single bladder or as a collection of joined bladders. Each panel 304 may formed into a variety of shapes as needed for a particular application. For example, as shown in FIG. 3, rectangular and pie-shaped panels 304 are shown. A person of ordinary skill in the art will appreciate that the panels 304 can be made into different shapes depending on the application.

In some embodiments, a plurality of tubes 306 can be wrapped around the tank 302 as a heat sink to provide additional temperature control. In such embodiments, fluid passing through the plurality of tubes 306 absorbs heat from the tank 302 to remove heat therefrom.

Figure 4:
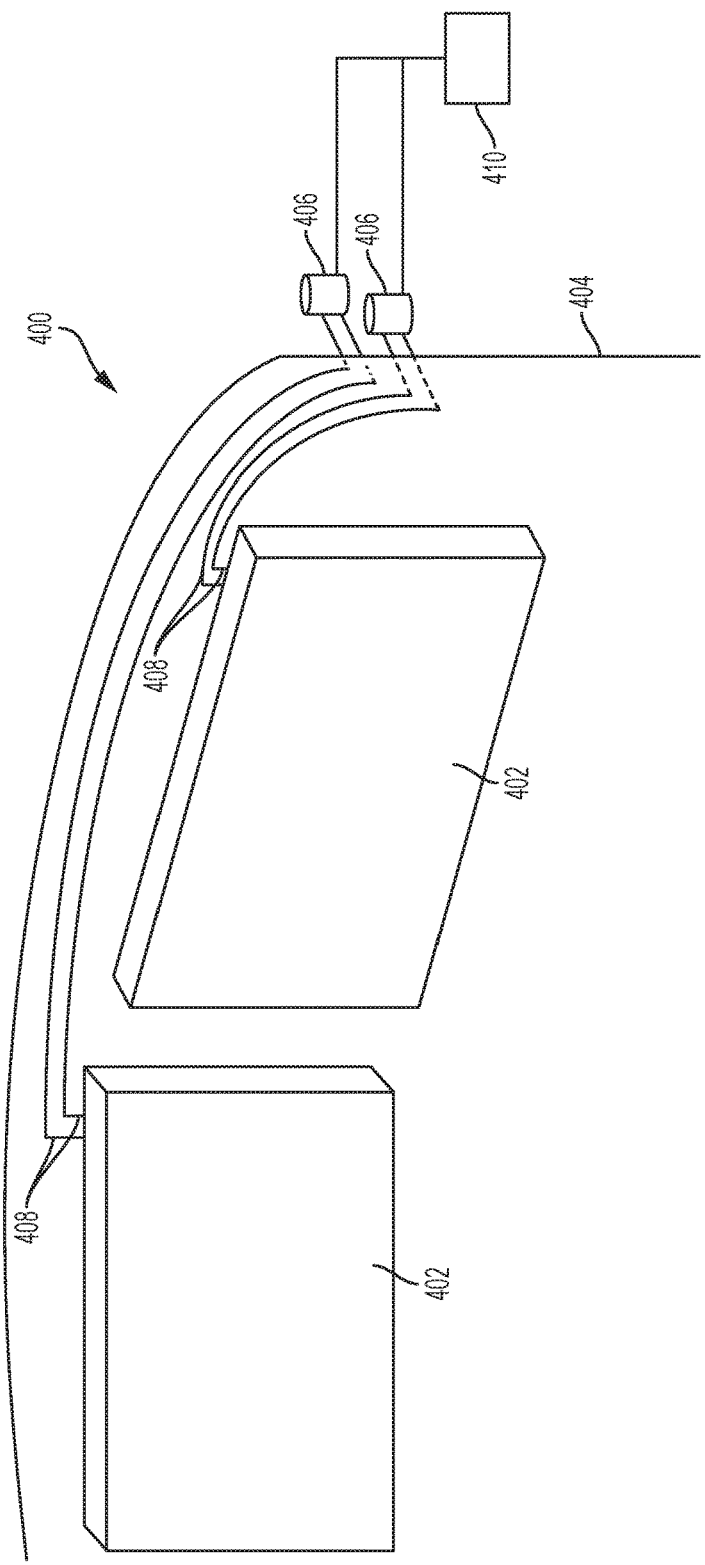
FIG. 4 is a partial schematic view of an embodiment of a hermetic heat shield bladder system 400.

FIG. 4 is a partial schematic view of an embodiment of a hermetic heat shield bladder system 400. The hermetic heat shield bladder system 400 comprises a plurality of hermetic heat shield bladders 402 that are positioned against a wall of a tank 404. The hermetic heat shield bladders 402 may be constructed similarly to the hermetic heat shield bladders 102, 202, and 302 discussed above. FIG. 4 illustrates two hermetic heat shield bladders 402, but additional bladders 402 may be included. Each bladder of the plurality of hermetic heat shield bladders 402 is coupled to a sensor 406 via leads 408. The leads 408 are configured to pass through the wall of the tank 404 and couple to the sensors 406. In some embodiments, the sensors 406 are electrical sensors. In some embodiments, the sensors 406 are coupled to a controller 410 that monitors information from the sensors 406 to monitor a condition of each hermetic heat shield bladder 402. For example, the sensors 406 can monitor the chemistry within the each hermetic heat shield bladder 402 to determine if a leak has formed. In some embodiments, the sensors 406 measure resistance of the inert gas within the hermetic heat shield bladder 402.

In the event that a hermetic heat shield bladder 402 has formed a leak, the sensor 406 measures a change in the chemistry of the inert gas within the bladder. In embodiments comprising the controller 410, the controller 410 detects a change in the chemistry within the hermetic heat shield bladder 402. The controller 410 can then identify the leaking hermetic heat shield bladder 402 and appropriate action may be taken. For example, the leaking hermetic heat shield bladder 402 may be repaired or replaced. In some embodiments, a source of gas, such as nitrogen gas, is connected with a pressure regulator to purge gas into the hermetic heat shield bladder 402 that is leaking to prevent molten salt from filling that bladder for some period of time while one is prepared to replace the bladder as a periodic maintenance.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A heat shield bladder system, comprising:

first and second heat shield bladders capable of being positioned adjacent to one another to form a tube that comprises the first and second heat shield bladders, each of the first and second heat shield bladders comprising:

an inner tube comprising a first end and a second end and an outer tube comprising a first end and a second end, wherein the inner tube is positioned inside of the outer tube and the first and second ends of the inner and outer tubes, respectively, are joined together forming a bladder in an annular space between the inner and outer tubes;

at least one reflective foil tube disposed within the bladder; and a plurality of spacers disposed within the bladder to space the at least one reflective foil from the inner and outer tubes.

2. The heat shield bladder system of claim 1, wherein each bladder of the first and second heat shield bladders are hermetically sealed bladders.

3. The heat shield bladder of claim 2, further comprising an inert gas disposed within each bladder, the inert gas selected from the group consisting of neon, argon, nitrogen, carbon dioxide, and krypton.

4. The heat shield bladder system of claim 1, wherein the at least one reflective foil comprises a foil of electropolished nickel.

5. The heat shield bladder system of claim 1, wherein:

the at least one reflective foil comprises at least two reflective foils; and the plurality of spacers includes spacers disposed between the at least two reflective foils to space the at least two reflective foils from each other.

6. The heat shield bladder system of claim 1, wherein the first and second ends of each inner sheet are curled so that the joined first and second ends are positioned away from an inner side of each heat shield bladder.

* * * * *